(12) United States Patent
Cheng

(10) Patent No.: US 6,786,133 B1
(45) Date of Patent: Sep. 7, 2004

(54) COFFEE MAKER WITH A POSITION ADJUSTABLE CONTROL UNIT

(75) Inventor: Sheng-Fang Cheng, Tainan Hsien (TW)

(73) Assignee: Tsann Kuen Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 10/645,945

(22) Filed: Aug. 22, 2003

(51) Int. Cl.$^7$ .............................. A23L 1/00; A47J 31/00; A47J 31/10; A47J 31/42; H05B 1/02

(52) U.S. Cl. .............................. 99/280; 99/285; 99/326; 99/468; 99/486

(58) Field of Search .......................... 99/325–333, 468, 99/486–489, 279–285, 295, 300–307, 316–323, 299; 219/492–494, 497, 501, 505, 508–510; 368/10

(56) References Cited

U.S. PATENT DOCUMENTS

| | | | | |
|---|---|---|---|---|
| 3,715,567 A | * | 2/1973 | Mandziak | 219/437 |
| 3,784,788 A | * | 1/1974 | Fourny | 219/441 |
| 3,969,610 A | * | 7/1976 | Ratti et al. | 219/441 |
| 4,649,810 A | * | 3/1987 | Wong | 99/326 |
| 5,001,969 A | * | 3/1991 | Moore et al. | 99/282 |
| 5,456,164 A | * | 10/1995 | Bang | 99/468 |
| 5,684,759 A | * | 11/1997 | Huang et al. | 368/10 |
| 5,802,957 A | * | 9/1998 | Wanat et al. | 99/327 |
| 5,964,141 A | * | 10/1999 | Andrew et al. | 99/280 |
| 6,085,638 A | * | 7/2000 | Mork et al. | 99/282 |
| 6,135,010 A | * | 10/2000 | Husted et al. | 99/319 |
| 6,247,393 B1 | * | 6/2001 | Chang | 99/348 |
| 6,427,581 B1 | * | 8/2002 | Wu | 99/332 |

* cited by examiner

*Primary Examiner*—Timothy P. Simone
(74) *Attorney, Agent, or Firm*—Trop, Pruner & Hu, P.C.

(57) ABSTRACT

A coffer maker includes a support unit having a base member formed with a neck that extends inwardly from a side portion thereof and that defines a bottom recess in the base member. A brewing unit is mounted on the support unit. A position adjustable control unit is mounted movably on the neck, extends into the bottom recess in the base member, and includes a control seat projecting outwardly from the bottom recess, and formed with a plurality of control switches electrically connected to the brewing unit.

6 Claims, 7 Drawing Sheets

COFFEE MAKER WITH A POSITION ADJUSTABLE CONTROL UNIT

BACKGROUND OF THE INVENTION

1. Field of the Invention

The present invention relates to a coffee maker, more particularly to a coffee maker with a position adjustable control unit.

2. Description of the Related Art

Referring to FIG. 1, a conventional coffee maker is shown to include a base member 11, a brewing unit 12, and a control unit 14. The base member 11 is adapted to be disposed on a supporting surface and is formed with a hot plate 13. A filter basket 121 is disposed at an elevation above and is vertically aligned with the hot plate 13. A water reservoir 122 extends upwardly from a rear side portion of the base member 11, and is connected to and is in fluid communication with the filter basket 121. The brewing unit 12 is mounted on the base member 11, and is electrically connected to the hot plate 13. The control unit 14 is mounted on the rear side portion of the base member 11, and includes a plurality of control switches (not shown) electrically connected to the brewing unit 12.

The conventional coffee maker is disadvantageous in that the position of the control unit 14 is not adjustable so that it is inconvenient to operate the control switches when the conventional coffee maker is disposed in a narrow space.

SUMMARY OF THE INVENTION

Therefore, the object of this invention is to provide a coffee maker with a position adjustable control unit so as to overcome the aforesaid disadvantage of the prior art.

According to the present invention, a coffee maker includes: a support unit including a base member adapted to be disposed on a supporting surface, having a side portion, and formed with a neck that extends inwardly from the side portion and that defines a bottom recess in the base member; a brewing unit mounted on the support unit; and a control unit mounted movably on the neck, extending into the bottom recess in the base member, and including a control seat projecting outwardly from the bottom recess and formed with a plurality of control switches electrically connected to the brewing unit.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
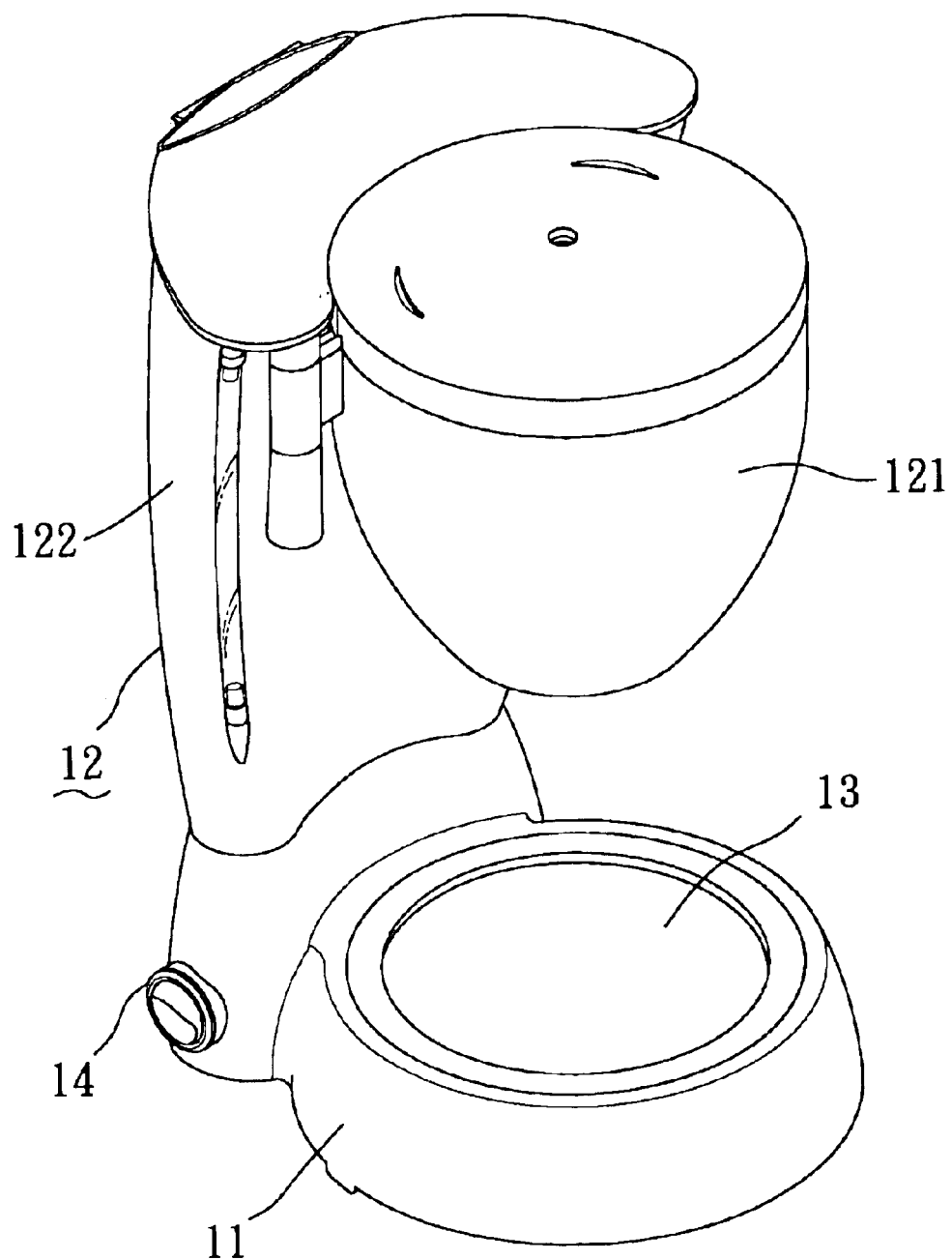
FIG. 1 is a perspective view of a conventional coffee maker.
Figure 2:
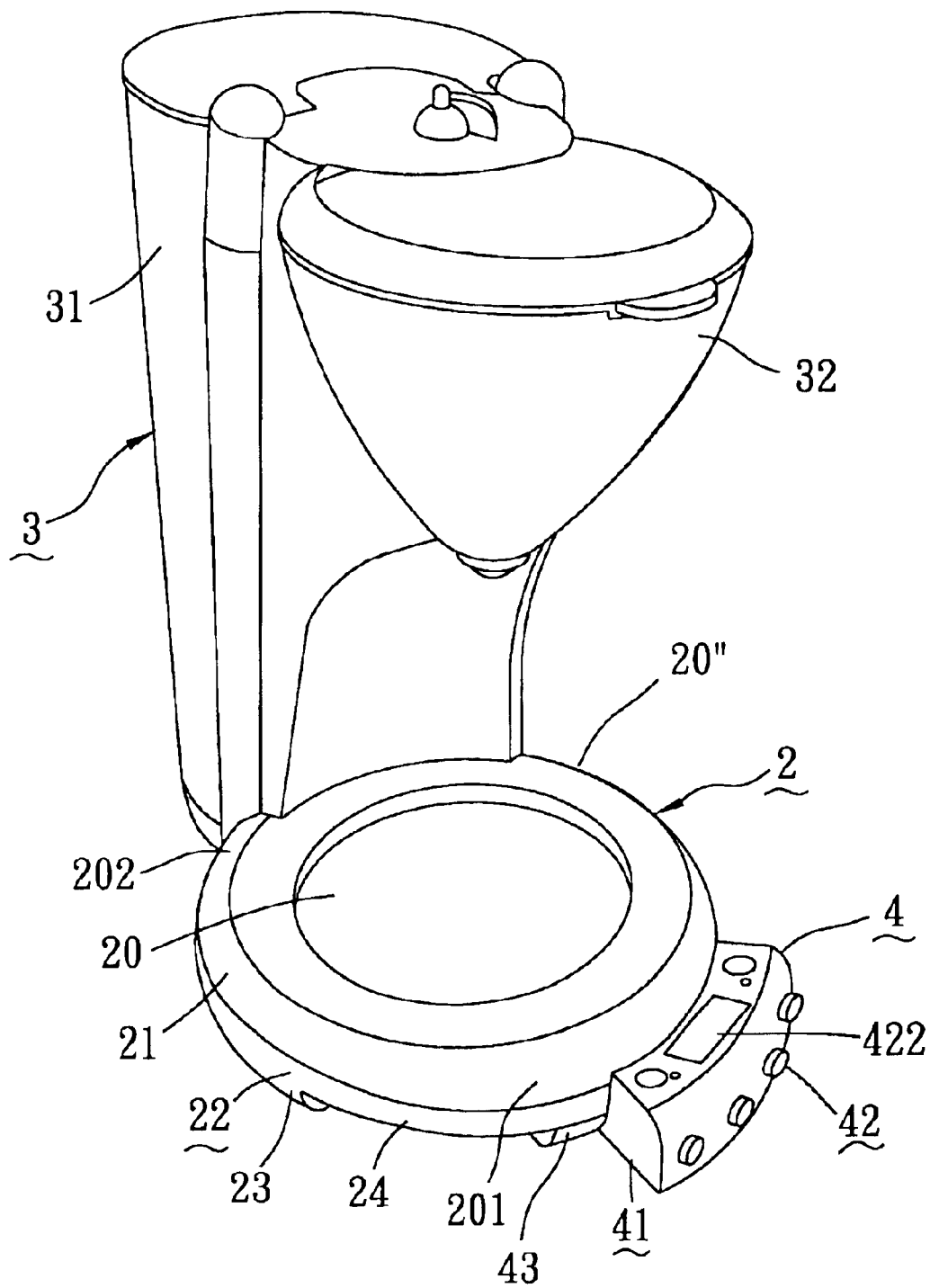
FIG. 2 is a perspective view of the preferred embodiment of coffee maker according to the present invention.
Figure 3:
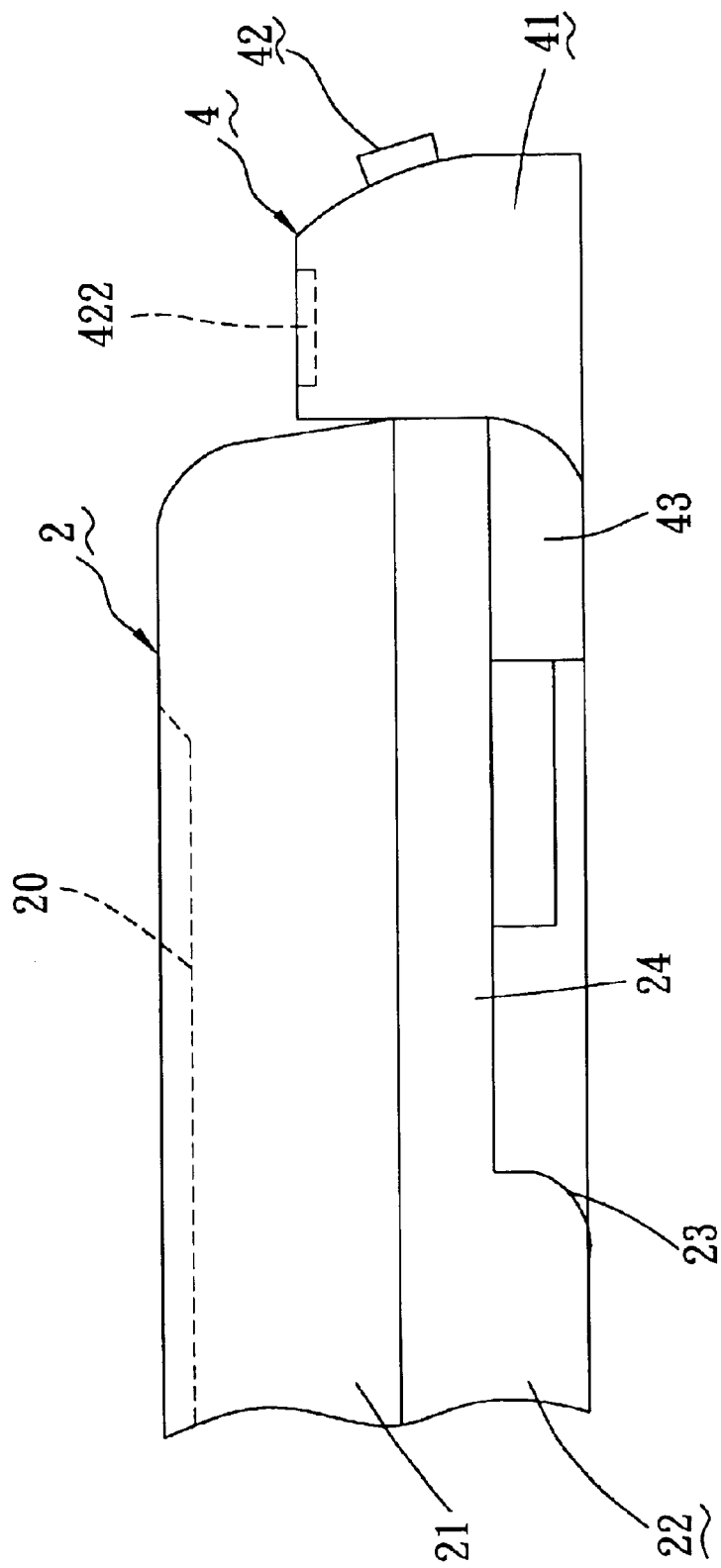
FIG. 3 is a fragmentary side view of a base member of the preferred embodiment, illustrating how a position adjustable control unit is mounted on the base member.
Figure 4:
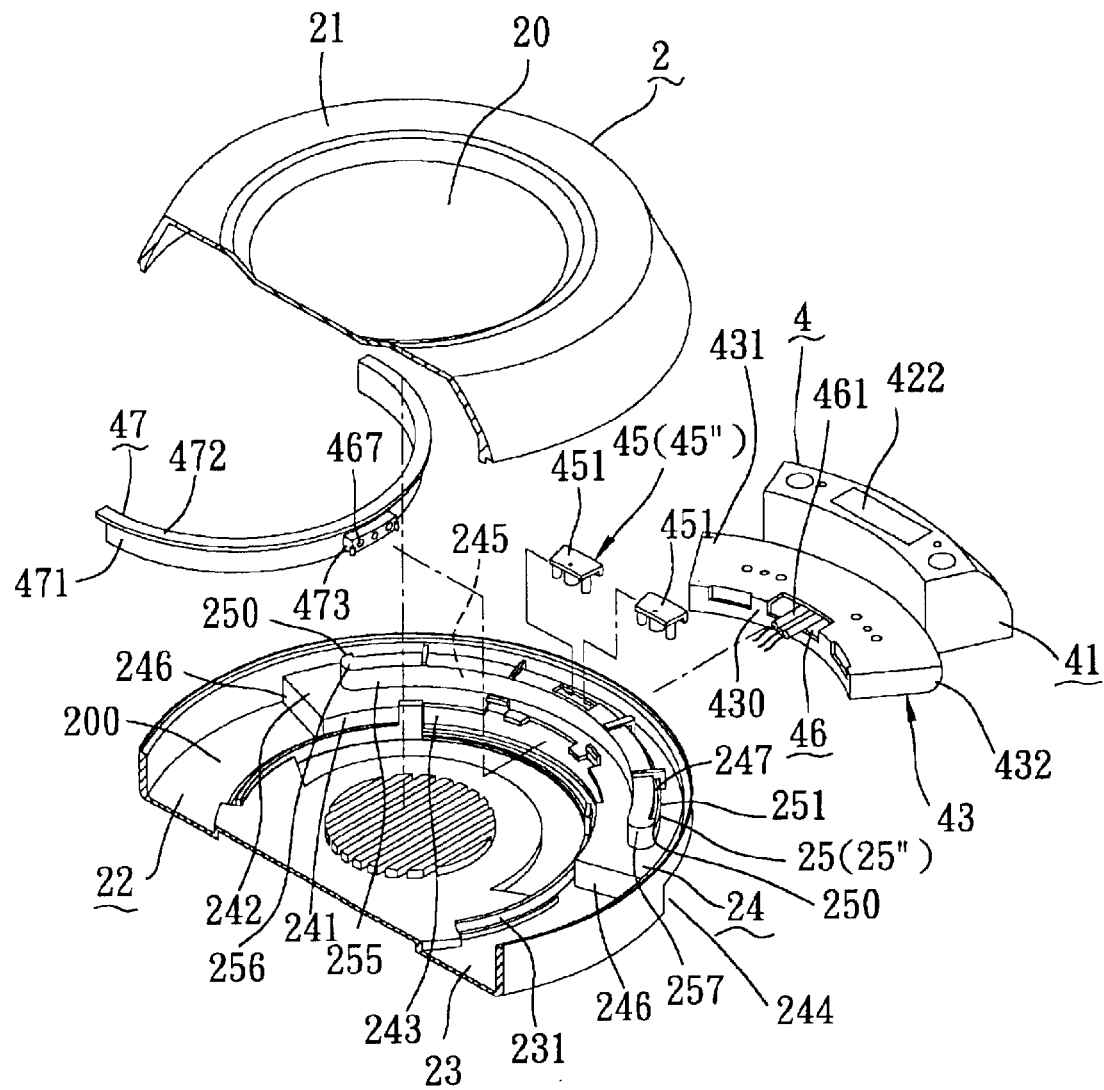
FIG. 4 is an exploded fragmentary perspective view of the base member.

Referring to FIGS. 2 to 4, the preferred embodiment of a coffee maker according to the present invention is shown to include a support unit 2, a coffee brewing unit 3, and a position adjustable control unit 4.

As illustrated, the support unit 2 includes a base member 20" adapted to be disposed on a supporting surface and formed with a hot plate 20. A filter basket 32 is disposed at an elevation above and is vertically aligned with the hot plate 20. The base member 20" has a rear side portion 202 and a front side portion 201 opposite to the rear side portion 202. The front side portion 201 of the base member 20" is formed with a neck 24 that extends inwardly therefrom and that defines a bottom recess 244 in the base member 20". A water reservoir 31 extends upwardly from the rear side portion 202 of the base member 20", and is connected to and is in fluid communication with the filter basket 32.

The coffee brewing unit 3 is mounted on the support unit 2 in a conventional manner. Since the structure of the brewing unit 3 is not relevant to the feature of the present invention, a detailed description thereof is omitted herein for the sake of brevity.

Figure 5:
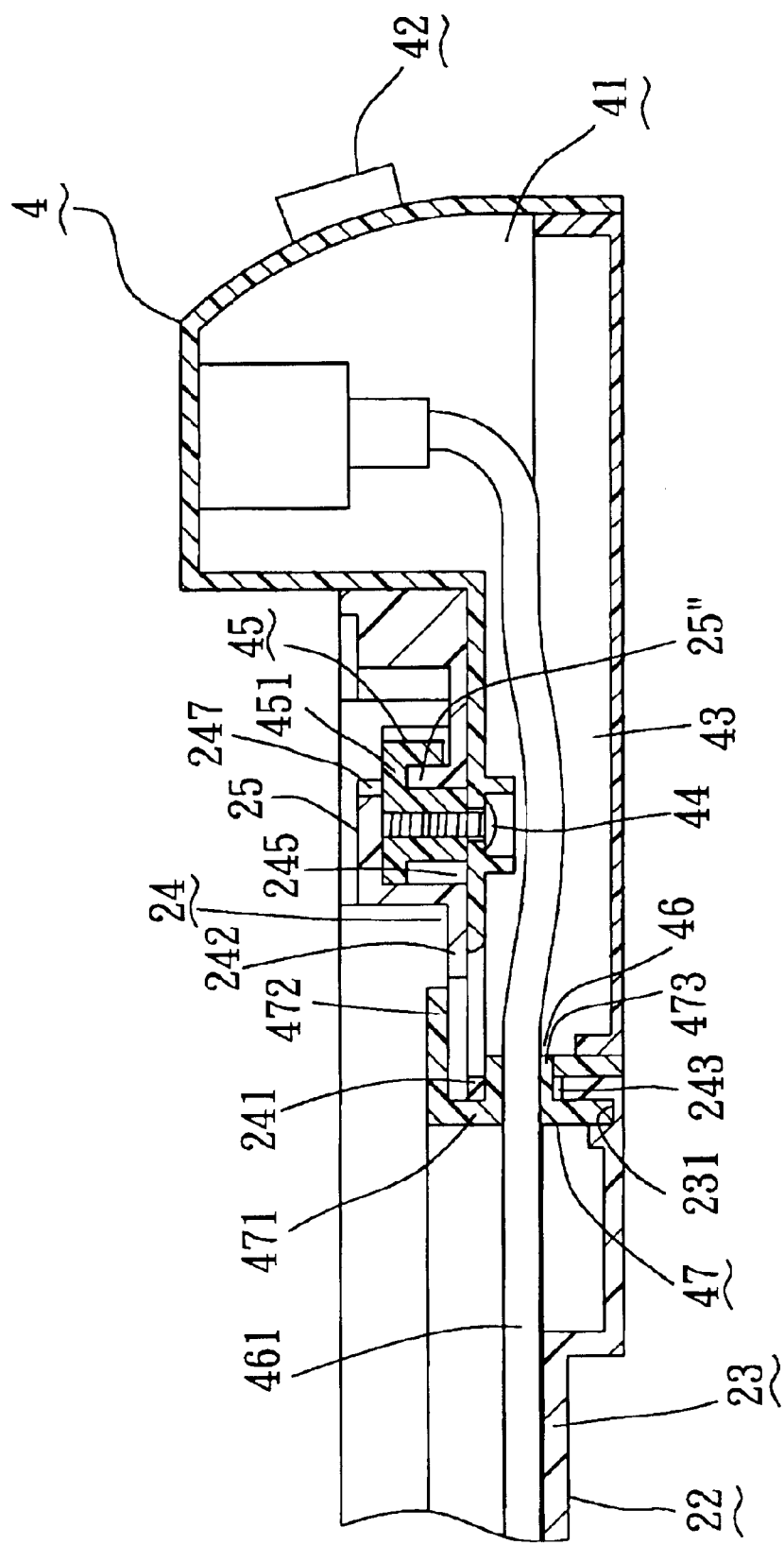
FIG. 5 is a fragmentary sectional side view of the base member.

The control unit 4 is mounted movably on the neck 24, extends into the bottom recess 244 in the base member 20", and includes a control seat 41 and a wire-holding seat 43. The control seat 41 projects outwardly from the bottom recess 244 and is formed with a plurality of control switches 42 electrically connected to the brewing unit 3. The control seat 41 is further formed with a display panel 422 to display thereon displaying information, such as temperature, heating time, etc. The neck 24 is formed with an arcuate rail 25" (see FIGS. 4 and 5) which has two opposite ends 250. The coffee maker further includes a slide unit 45" that is secured to the control unit 4, and that is slidably mounted on the rail 25" between the opposite ends 250 of the arcuate rail 25". The structure of the slide unit 45" and the arcuate rail 25" will be described in the following paragraphs.

Figure 6:
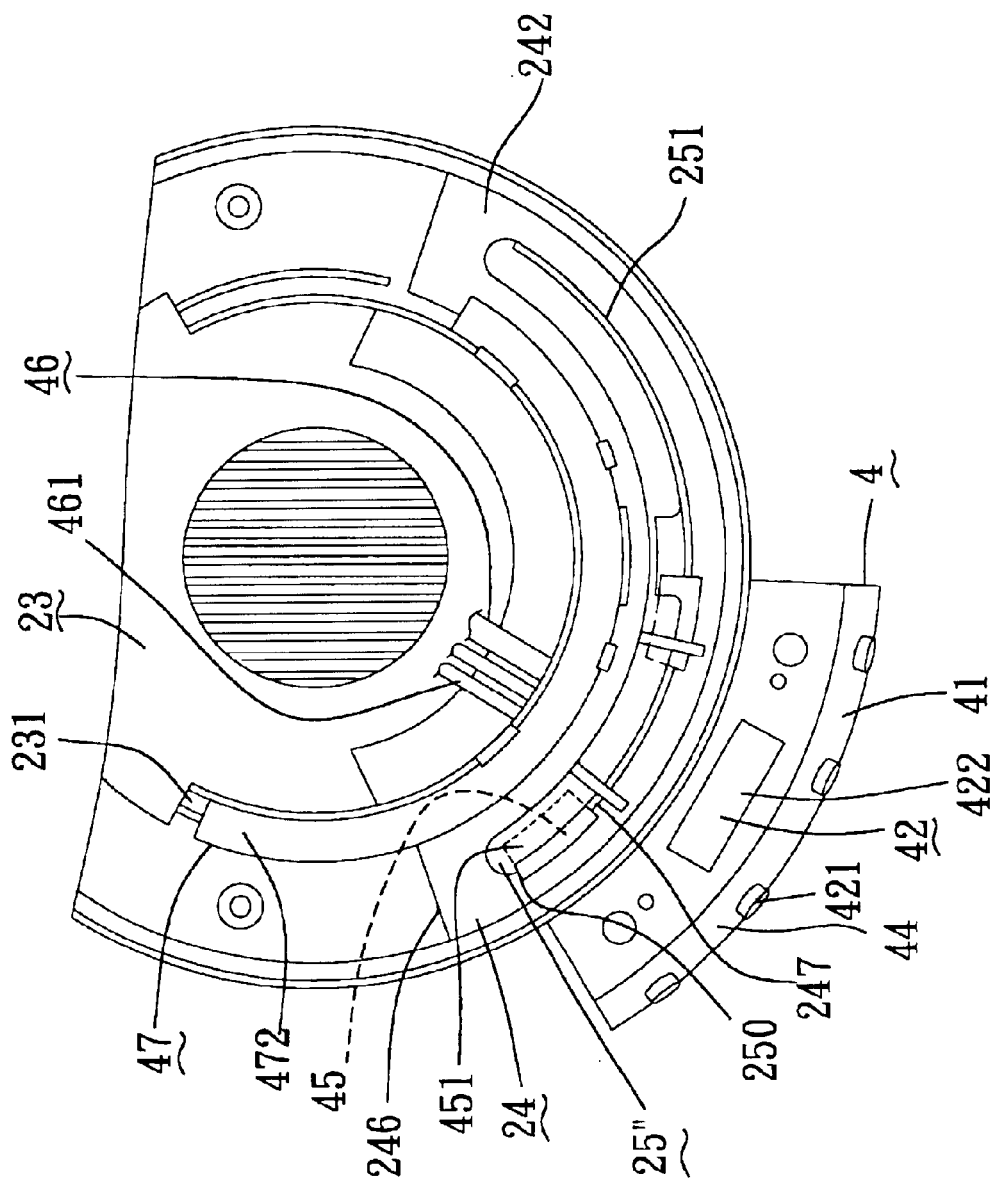
FIG. 6 is a fragmentary top planar view of the base member of the preferred embodiment, illustrating the control unit in a left position.
Figure 7:
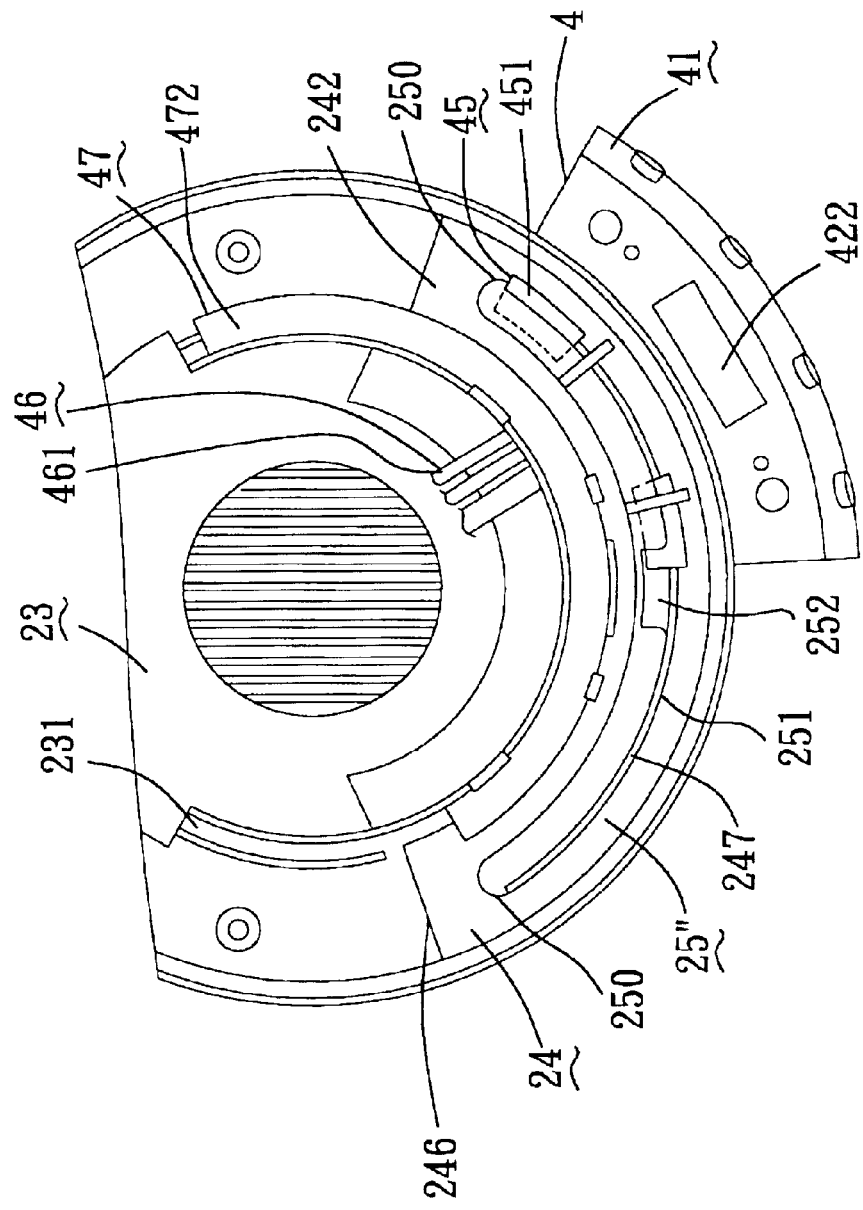
FIG. 7 is a fragmentary top planar view of the base member of the preferred embodiment, illustrating the control unit in right position.

The base member 20" preferably includes an annular upper half 21 that is formed with an upwardly opening recess that fittingly receives the hot plate 20, and an annular lower half 22 coupled to the upper half 21 to define an inner space 200 therebetween. The lower half 22 includes a bottom plate 23, and is formed with the neck 24. The neck 24 is preferably arcuate in shape, and has an arcuate side wall 241 that projects upwardly from the bottom plate 23 into the inner space 200 and that defines a rear side of the bottom recess 244, two lateral side walls 246 that extend radially and respectively from two opposite ends of the arcuate side wall 241 to define two lateral sides of the bottom recess 244 respectively, and a top wall 242 that extends radially and outwardly from the arcuate side wall 241 and that interconnect the lateral side walls 246. The neck 24 is formed with an arcuate hollow rib 25 that projects upwardly from the top wall 242 of the neck 24 into the inner space 200 in the base member 20" and that has a peripheral wall 257 defining a receiving space 245 (see FIG. 5) therein. The peripheral wall 257 of the rib 25 includes an arcuate rear wall portion 255 (see FIG. 4) extending upwardly into the inner space 200 from the top wall 242 of the neck 24, an arcuate front wall portion 251 opposite to the arcuate rear wall portion 255, and an upper wall portion 256 extending radially from the arcuate rear wall portion 255 to the front wall portion 251 and cooperating with the arcuate front wall portion 251 to define a corner therebetween. An arcuate groove 247 is formed in the corner between the upper and front wall portions 251, 256 and is in spatial communication with the receiving space 245 and the inner space 200 of the base member 20". Under this condition, the arcuate front wall portion 251 of the peripheral wall 257 defines the rail 25", which defines a bottom side of the arcuate groove 247. The wire-holding seat 43 is disposed movably within the bottom recess 244 in the base member 20", is secured to the control seat 41, and has an inner wall 430 in sliding contact with the arcuate side wall 241 of the neck 24, two opposite lateral walls 432 that extend radially and respectively from two opposite ends of the inner wall 430 toward the control seat 41, and an upper wall 431 that interconnects the lateral walls 432 of the wire-holding seat 43 and that slidably contacts the top wall 242 of the neck 24. The slide unit 45" preferably includes first and second slides 45 that are secured to the upper wall 431 of the wire-holding seat 43 and that project upwardly from the upper wall 431 of the wire-holding seat 43 into the receiving space 245 of the rib 25, that are disposed adjacent to the lateral walls 432 of the wire-holding seat 43, respectively, and that have first and second hook portions 451 extending through the arcuate groove 247 and anchoring on the rail 25" (see FIG. 5). A plurality of fastener screws 44 extend into the receiving space 245 of the rib 25 and through the upper wall 431 of the wire-holding seat 43 to engage the first and second slides 45, respectively, so as to prevent untimely and undesired removal of the wire-holding seat 43 and the control seat 41 from the bottom recess 244 in the base member 20". Under this condition, the wire-holding seat 43 together with the control seat 4 is movable within the bottom recess 244 in the base member 20" between a left position of FIG. 6, in which the first hook portion 451 abuts against one of the opposite ends 250 of the rail 25" so as to prevent further leftward movement of the control unit 4, and a right position of FIG. 7 which is angularly spaced apart from the left position and in which the second hook portion 451 abuts against the other one of the opposite ends 250 of the rail 25" so as to prevent further rightward movement of the control unit 4.

In this preferred embodiment, the arcuate side wall 241 of the neck 24 is formed with an arcuate opening 243 that is in spatial communication with the inner space 200 in the base member 20" and the bottom recess 244. The control unit 4 includes a plurality of wires 461 that are mounted on the wire-holding seat 43 and that have inner ends extending into the inner space 200 in the base member 20" through the arcuate opening 243 in the arcuate side wall 241 of the neck 24 for connecting electrically with the coffee brewing unit 3, and outer ends extending into the control seat 41 for connecting electrically with the control switches 42. The bottom plate 23 of the lower half 22 is formed with an arcuate sliding groove 231 within the inner space 200 in the base member 20" adjacent to the arcuate side wall 241 of the neck 24. The inner wall 430 of the wire-holding seat 43 is preferably formed with an opening 46 that permits extension of the wires 461 therethrough. An inverted L-shaped mounting piece 47 is disposed within the inner space 200 in the base member 20", has a horizontal section 472 disposed slidably on the top wall 242 of the neck 24, a vertical section 471 extending downwardly from the horizontal section 472 and into the arcuate sliding groove 231 in the bottom plate 23, and a retention block 473 that is secured to the vertical section 471, that extends through the arcuate opening 243 in the arcuate side wall 241 of the neck 24, and that is snugly fitted into the opening 46 in the inner wall 430 of the wireholding seat 43. Under this condition, the mounting piece 47 simultaneously moves with the wire-holding seat 43 when the wire-holding seat 43 is moved within the bottom recess 244. The retention block 473 is formed with a plurality of wire passages 467 to permit extension of the wires 461 therethrough.

Since the position of the control unit 4 of the coffee maker of the present invention is adjustable, the aforesaid disadvantage of the prior art is accordingly overcome.

With this invention thus explained, it is apparent that numerous modifications and variations can be made without departing from the scope and spirit of this invention. It is therefore intended that the invention be limited only as indicated in the appended claims.

I claim:

1. A coffee maker comprising:
 a support unit including a base member adapted to be disposed on a supporting surface, having a side portion, and formed with a neck that extends inwardly from said side portion and that defines a bottom recess in said base member;
 a brewing unit mounted on said support unit; and
 a control unit mounted movably on said neck, extending into said bottom recess in said base member, and including a control seat projecting outwardly from said bottom recess and formed with a plurality of control switches electrically connected to said brewing unit.

2. The coffee maker as defined in claim 1, wherein said neck is formed with an arcuate rail which has two opposite ends, said coffee maker further comprising a slide unit that is secured to said control unit, and that is slidably mounted on said arcuate rail between said opposite ends of said arcuate rail.

3. The coffee maker as defined in claim 2, wherein said base member includes an annular upper half and an annular lower half coupled to said upper half to define an inner space therebetween, said lower half including a bottom plate, and being formed with said neck, said neck being arcuate in shape, and having an arcuate side wall that projects upwardly from said bottom plate into said inner space and that defines a rear side of said bottom recess, two lateral side walls extending radially and respectively from two opposite ends of said arcuate side wall to define two lateral sides of said bottom recess, respectively, and a top wall that extends radially and outwardly from said arcuate side wall and that interconnect said lateral side walls, said neck being formed with an arcuate hollow rib that projects upwardly from said top wall into said inner space, said hollow rib defining a receiving space therein and being formed with an arcuate groove that is in spatial communication with said receiving space and said inner space, said arcuate rail defining a bottom side of said arcuate groove.

4. The coffee maker as defined in claim 3, wherein said control unit further includes a wire-holding seat disposed movably within said bottom recess, secured to said control seat, and having an inner wall in sliding contact with said arcuate side wall of said neck, two opposite lateral walls that extend radially and respectively from two opposite ends of said inner wall toward said control seat, and an upper wall that interconnects said lateral walls of said wire-holding seat and that slidably contacts said top wall of said neck, said slide unit including first and second slides that are secured to said upper wall of said wire-holding seat, and that project from said upper wall of said wire-holding seat into said receiving space in said hollow rib, that are disposed adjacent to said lateral walls of said wire-holding seat, respectively, and that have hook portions extending into said arcuate groove and anchoring on said rail.

5. The coffee maker as defined in claim 4, wherein said arcuate side wall of said neck is formed with an arcuate opening that is in spatial communication with said inner space and said bottom recess, said control unit further including a plurality of wires mounted on said wire-holding seat and having inner ends extending into said inner space through said arcuate opening in said arcuate side wall for connecting electrically with said brewing unit, and outer ends extending into said control seat for connecting electrically with said control switches.

6. The coffee maker as defined in claim 5, wherein said bottom plate of said lower half is formed with an arcuate sliding groove within said inner space adjacent to said arcuate side wall of said neck, said inner wall of said wire-holding seat being formed with an opening that permits extension of said wires therethrough, said base member further including an inverted L-shaped mounting piece that is disposed within said inner space in said base member, that has a horizontal section disposed slidably on said top wall of said neck, a vertical section extending downwardly from said horizontal section and into said arcuate sliding groove in said bottom plate, and a retention block that is secured to said vertical section, that extends through said arcuate opening in said arcuate side wall, and that is snugly fitted into said opening in said inner wall of said wire-holding seat such that said mounting piece simultaneously moves with said wire-holding seat when said wire-holding seat is moved within said bottom recess, said retention block being formed with a plurality of wire passages to permit extension of said wires therethrough.

\* \* \* \* \*